F. ANDERSON.
FOUNTAIN SOLDERING IRON.
APPLICATION FILED OCT. 16, 1916.
1,256,970.
Patented Feb. 19, 1918.
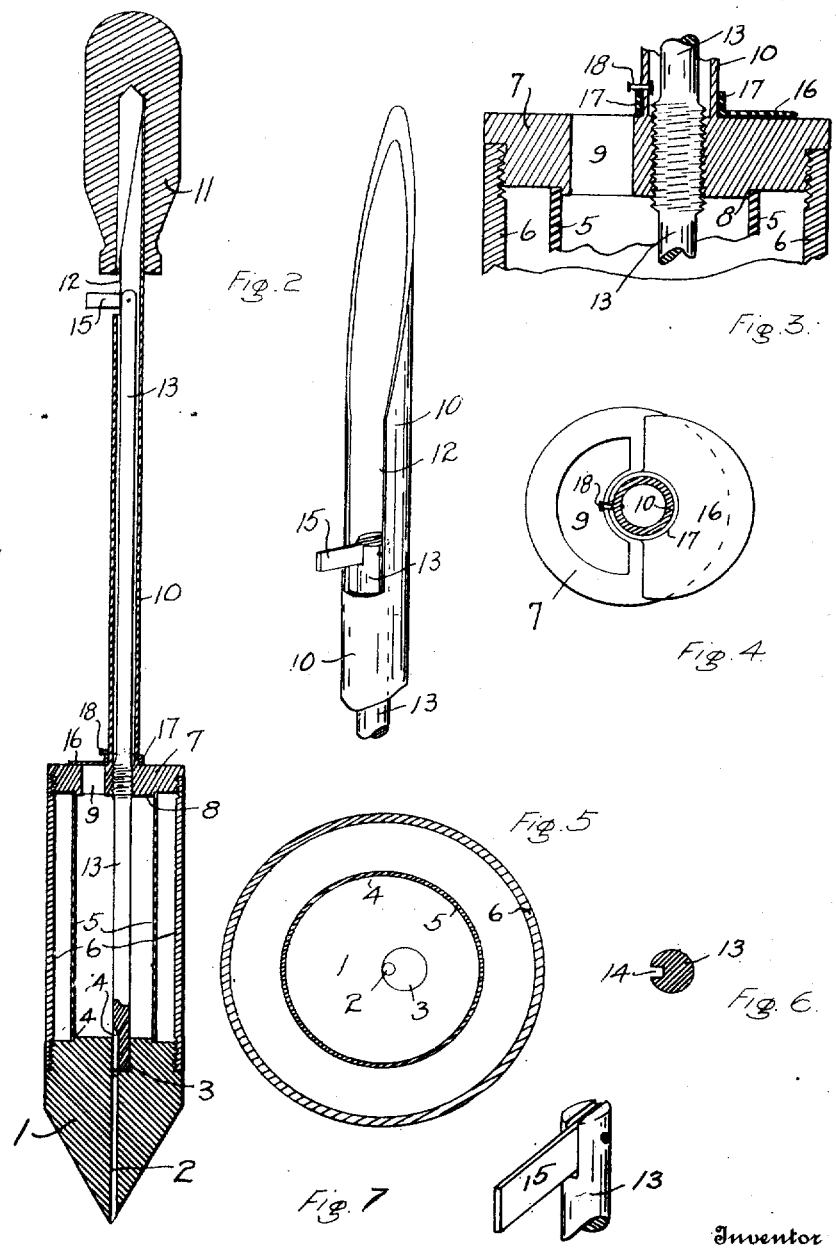
Inventor
Fred. Anderson
By  M. J. Elliott
Attorney

UNITED STATES PATENT OFFICE.

FRED ANDERSON, OF TACOMA, WASHINGTON.

FOUNTAIN SOLDERING-IRON.

1,256,970. Specification of Letters Patent. Patented Feb. 19, 1918.

Application filed October 16, 1916. Serial No. 125,851.

*To all whom it may concern:*

Be it known that I, FRED ANDERSON, a subject of the King of Sweden, residing at Tacoma, in the county of Pierce, State of Washington, have invented certain new and useful Improvements in Fountain Soldering-Irons, of which the following is a specification.

This invention relates to soldering irons and especially to that class thereof which contain a supply of molten solder within a reservoir. The objects of this invention are to protect the molten solder from cooling by radiation and convection and thus enable the iron to be used a greater length of time without reheating; to enable the iron to be used in inverted position without losing the solder from the reservoir; to simplify the construction; to improve the means for controlling the solder outlet; and to improve the construction of the iron whereby it will be cheap to make and yet be adapted for use by linemen in the construction, maintenance, and repair of wires used for transmission of electricity either for telegraph, telephone, power or lighting purposes.

I attain these and other objects by the devices, mechanisms, and arrangements illustrated in the accompanying drawings, in which—

Figure 1 is a longitudinal section of my improved fountain soldering iron; Fig. 2 is a perspective view of the upper or handle end of the shank thereof; Fig. 3 is a section of the reservoir top; Fig. 4 is a plan thereof; Fig. 5 is a cross-section of the reservoir, the control-rod having been removed therefrom; Fig. 6 is a cross-section of the control-rod at a point near the lower end thereof; and Fig. 7 is a perspective view of the upper end of the control-rod.

Similar numerals of reference refer to similar parts throughout the several views.

This invention consists of a solder head 1 having an outlet passage 2 therethrough, said outlet passage extending in a straight line from the inner end of the head to a point adjacent the point thereof, as shown. A cylindrical cavity 3 is formed in the inner end of the head 1, said cavity being positioned so that said passage 2 enters the edge of the cavity. The passage 2 and cavity 3 are preferably slightly eccentric from the central axis of the head 1. A shoulder 4 is formed on the inner end of the head 1, said shoulder being circular and concentric with the central axis of the head. The outer edge of the head 1 is screw-threaded. An inner reservoir tube 5 fits around the shoulder 4, and an outer covering tube 6 screws on the said screw-threaded part of the head 1, said tubes 5 and 6 being concentrically positioned but separated from each other by an air insulation space.

A top or closure plate 7 is also provided with a shoulder 8, corresponding with the above-mentioned shoulder 4, and is screw-threaded around its outer edge, said parts being adapted to engage the tubes 5 and 6 to complete the reservoir structure. A large hole 9 (Figs. 1, 3 and 4) passes through the top 7 and communicates with the interior of the reservoir tube 5 and is adapted to permit the insertion of a supply of bar or molten solder into the interior thereof. A closure is provided for said hole as hereinafter described.

A tubular shank 10 extends upward from the plate 7, said shank being coaxial with the cylindrical cavity 3 in the head 1 above mentioned. The upper end of the shank 10 is cut on an incline, as shown, to enable it to be driven readily into the wooden handle 11, and a short slot 12 is cut in the side of the tube at the bottom of said inclined cut. A control-rod 13 passes axially in said shank and passes through a screw-threaded hole in the plate 7, being suitably threaded therefor, and then passes downward through the reservoir and into the cavity 3 in the head 1, the lower end of the said rod 13 having a slot 14 therein, said slot extending upward from the lower end to a point well above the top of the cavity 3 when the said rod is screwed home in the cavity. The upper end of the rod 13 is slotted across it and an operating lever 15 is pivotally secured therein, said lever extending through the slot 12 in the shank 10 at a point below the handle 11. The lever 15 and the slot 14 are so positioned around the axis of the rod 13 that, when the slot 14 and the passage 2 are in line and therefore in communication, the lever 15 is in engagement with the left side of the slot 12 and so that when the lever 15 is moved to the right it screws the rod 13 down slightly and also cuts off communication between the slot 14 and the passage 2.

A closure plate 16 is mounted on a collar 17 fitting around the base of the tubular shank 10, said plate 16 being held down over the hole 9 by a pin 18 in the shank, but being movable from said closing position by swinging it around the shank, as shown in Figs. 3 and 4.

It will readily be seen that if the solder contained in the reservoir tube 5 is once melted, or if it is inserted therein in a molten condition, that it is very thoroughly protected from cooling by the air jacket surrounding it and that therefore it will keep in said molten condition a far longer time than it could if the air jacket were omitted. Further, it will be seen that the plate 16 completely closes the supply hole 9 so that the iron may be used above the operator without danger of the molten solder falling on him therefrom. Further, the position of the lever 15 is such as to be very convenient to the end of the thumb of the operator. When the lever is turned to the left the passage 2 is in open communication with the reservoir so that solder may flow therefrom, while if the lever is turned to the right the rod 13 blocks the said communications and solder cannot pass from the reservoir.

Having described my invention what I claim is:—

1. A soldering iron, comprising a head having an outlet passage, a plate in line with and spaced from the head, inner and outer concentric tubes, the inner tube being seated at its ends against the opposing faces of the head and plate, and the outer tube being threaded at its ends to the head and plate, and a rod passing through the plate and inner tube and entering the head a short distance and having a lateral passage to register with the outlet passage of the head, said rod having screw thread connection with the plate, whereby on turning said rod its inner end is advanced and seated against the soldering head and its passage moved away from the outlet passage of the said head to cut off delivery of the solder contained in the inner tube.

2. A soldering iron, comprising a head having an outlet passage, a cylindrical cavity in its inner end in communication with the outlet passage, a shoulder on its inner end and having its inner portion exteriorly screw threaded for a short distance, a plate in line with and spaced from the head and having a shoulder on its inner face and its edge screw-threaded, an inner reservoir tube having its ends receiving the shoulders of the head and plate, an outer tube threaded at its ends to the plate and head, a tubular shank extending from the plate, and a rod passing through the shank, plate and inner tube, and entering the said cylindrical cavity and having a lateral passage to register with the outlet passage of the head, said rod having screw thread connection with the plate to advance its inner end and seat it in the said cavity and throw its passage out of line with the said outlet passage on turning the rod in one direction.

FRED ANDERSON.